(12) United States Patent
Irokawa et al.

(10) Patent No.: US 6,202,680 B1
(45) Date of Patent: Mar. 20, 2001

(54) POSITIONER AND ITS SETTING METHOD

(75) Inventors: Kenji Irokawa; Tomohiko Aki, both of Ibaraki-ken (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/352,779

(22) Filed: Jul. 14, 1999

(30) Foreign Application Priority Data

Jul. 16, 1998 (JP) .................................. 10-202262

(51) Int. Cl.[7] .................................................. F16K 31/128
(52) U.S. Cl. ........................ 137/487.5; 137/2; 137/488; 251/129.04
(58) Field of Search ............................... 137/488, 487.5, 137/2; 251/129.04

(56) References Cited

U.S. PATENT DOCUMENTS

| | | | |
|---|---|---|---|
| 5,197,328 | * 3/1993 | Fitzgerald | 137/487.5 |
| 5,431,182 | * 7/1995 | Brown | 137/487.5 |
| 5,558,115 | * 9/1996 | Lenz et al. | 137/487.5 |
| 5,687,098 | * 11/1997 | Grumstrup et al. | 137/487.5 |
| 5,848,609 | * 12/1998 | Marchsseault et al. | 137/624.11 |
| 5,931,180 | * 8/1999 | Nagasaka | 137/487.5 |

* cited by examiner

*Primary Examiner*—Gregory L. Huson
*Assistant Examiner*—Ramesh Krishnamurthy
(74) *Attorney, Agent, or Firm*—Oblon, Spivak, McClelland, Maier & Neustadt, P.C.

(57) ABSTRACT

A positioner and method for generating an output signal for setting a controlled object to a control condition corresponding to an input signal, including a memory unit for storing a conversion relation for converting the input signal to a command signal; a signal conversion unit for converting the input signal to the command signal based on the conversion relation; a control unit for generating the output signal for controlling the controlled object corresponding to the command signal; and a setting unit for adjusting the command signal to obtain a desired control condition for each of a plurality of selected input signals, thereby generating a modified conversion relation between the input signal and the command signal. The modified conversion relation generated by the setting unit is stored in the memory unit as the conversion relation.

8 Claims, 8 Drawing Sheets

POSITIONER AND ITS SETTING METHOD

BACKGROUND OF THE INVENTION

1. Field of the Invention:

The present invention relates to a positioner which can easily set an output signal such that a controlled object is set to an arbitrary control condition corresponding to an input signal and its setting method.

2. Description of the Related Art:

Positioners have been used for controlling actuators such as diaphragm motors, cylinders and the like. The positioner controls a pressurized fluid in response to an input signal inputted as an electric signal, an air pressure signal or the like and sets a rotational angle of a rotary shaft of the diaphragm motor, a displacement position or the like of a piston of the cylinder to a given angle and position.

For example, in case the diaphragm motor which is controlled by this positioner is used for opening or closing a valve, a flow rate of a fluid which flows through the valve can be controlled in response to an input signal such as an electric signal, an air pressure signal or the like inputted to the positioner.

In the above flow rate control, the rotational angle of the rotary shaft of the diaphragm motor is not necessarily proportional to the flow rate of the fluid which passes through the valve. Conventionally, in setting the input signal inputted to the positioner and the flow rate of the fluid which passes through the valve to have a proportional relation, flow rate characteristics respectively corresponding to a large number of input signals are required to be measured and a conversion relation which makes the flow rate characteristics linear must be obtained. Accordingly, an operation for setting the conversion relation is complexed and such a setting operation takes a considerably long time and pushes up the cost.

SUMMARY OF THE INVENTION

It is a general object of the present invention to provide a positioner which can set a conversion relation in a short time and can reduce the cost needed in setting such a conversion relation and a method for performing such a setting.

It is a main object of the present invention to provide a positioner which can easily set an arbitrary conversion relation and a method for performing such a setting.

The above and other object, features and advantages of the present invention will become more apparent from the following description when taken in conjunction with the accompanying drawings in which a preferred embodiment of the present invention is shown by way of illustrative examples.

DESCRIPTION OF THE PREFERRED EMBODIMENT

A positioner and its setting method according to the present invention are explained in detail hereinafter with reference to a preferred embodiment in conjunction with attached drawings.

Figure 1:
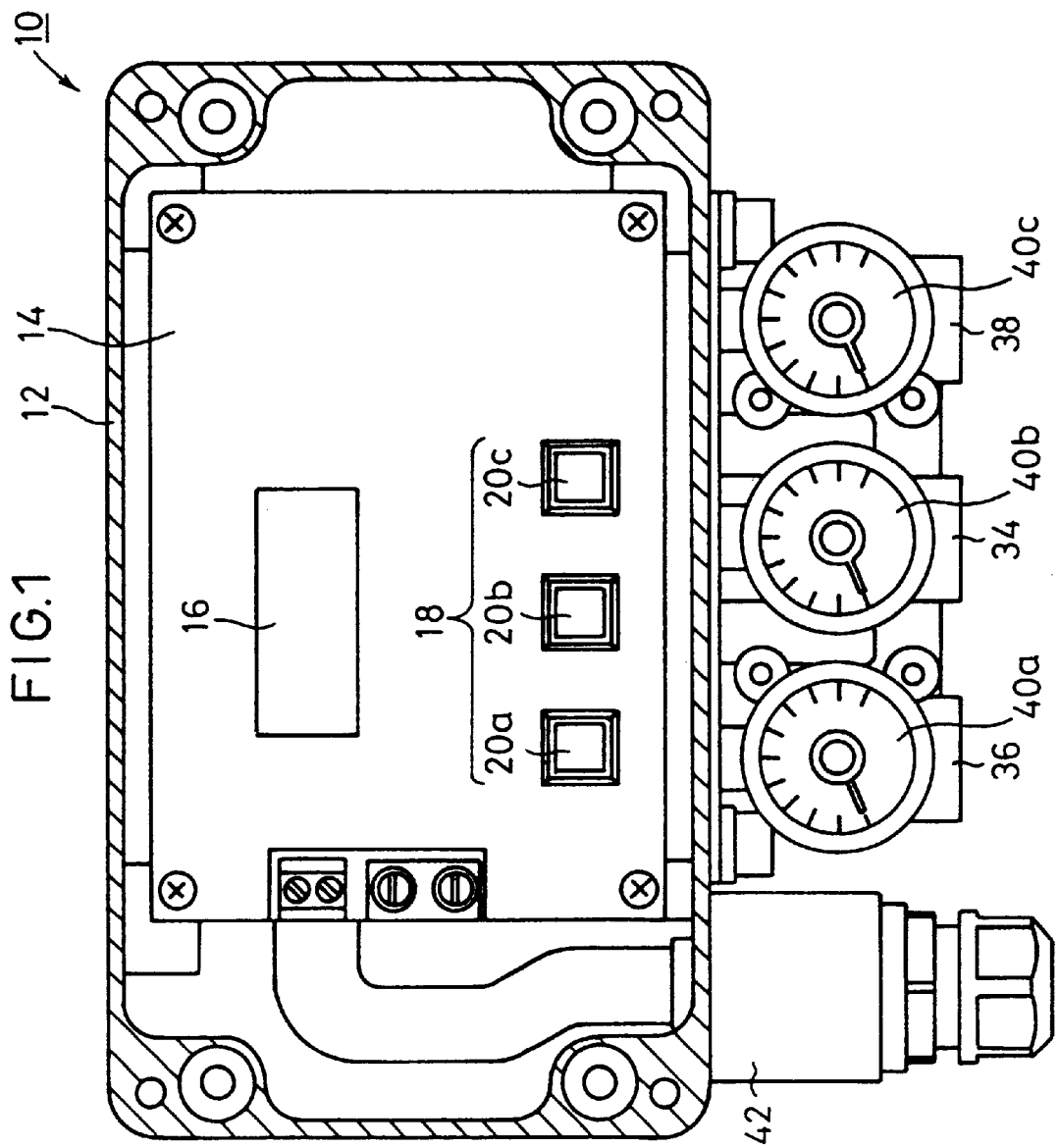
FIG. 1 is a partial cross-sectional view of a positioner according to an embodiment of the present invention.
Figure 2:
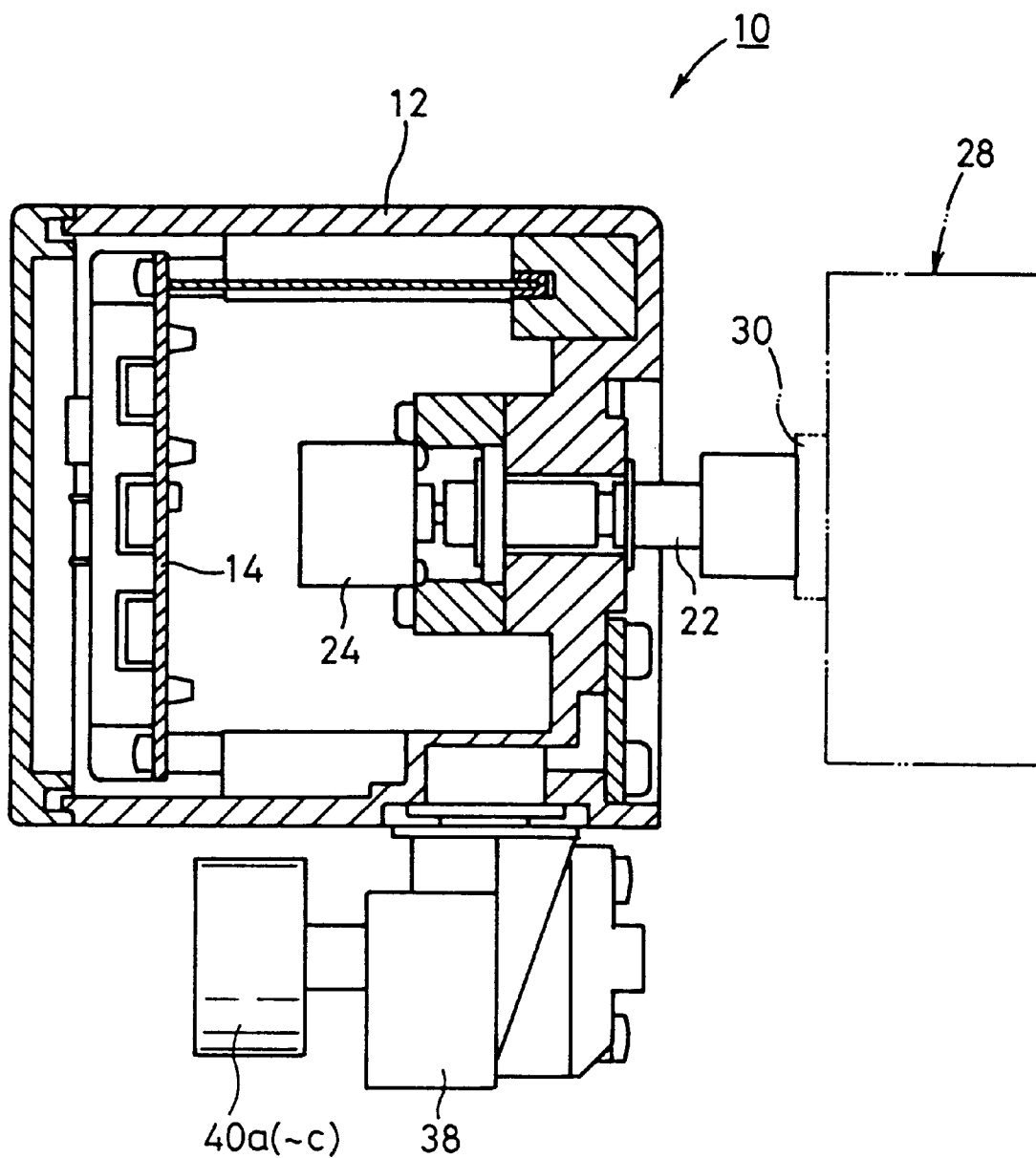
FIG. 2 is a longitudinal cross-sectional view of the positioner shown in FIG. 1.
Figure 3:
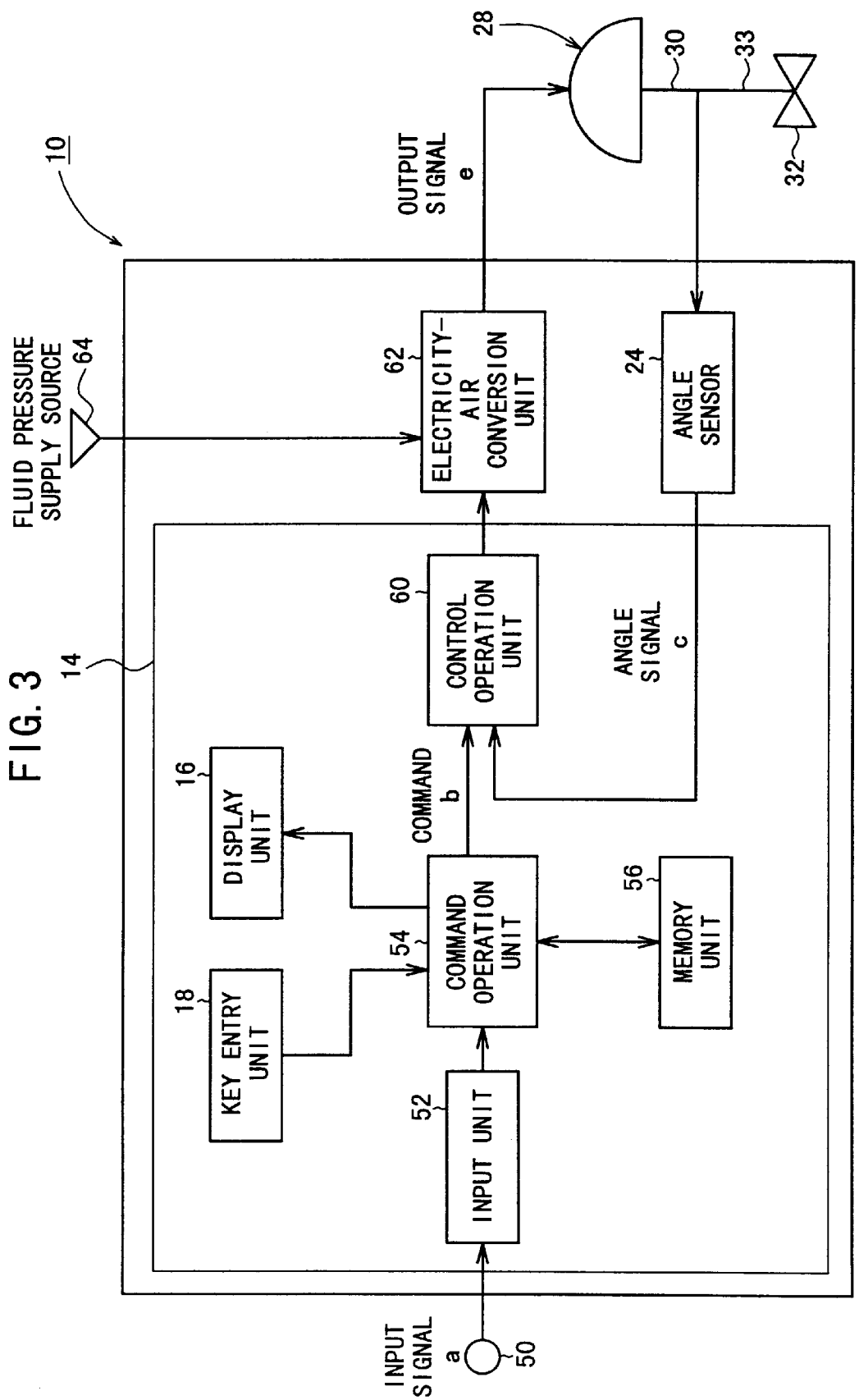
FIG. 3 is a circuit block diagram of the positioner shown in FIG. 1.

In FIG. 1 and FIG. 2, numeral 10 indicates a positioner according to this embodiment. The positioner 10 includes a casing 12 in which a printed board 14 is disposed. A display unit 16 and a key entry unit 18 which constitutes a setting unit are mounted on the printed board 14. The key entry unit 18 is provided with an up key 20a, a down key 20b and a set key 20c. A feedback shaft 22 is pivotally mounted on the casing 12. One end of the feed back shaft 22 is connected to an angle sensor 24. The other end of the feed back shaft 22 is connected to a rotary shaft 30 of a diaphragm motor 28 which constitutes a controlled object of this positioner 10. As shown in FIG. 3, the rotary shaft 30 of a diaphragm motor 28 is connected to a drive shaft 33 of a valve 32 and a degree of opening of the valve 32 is regulated by an amount of rotation of the rotary shaft 30.

The casing 12 is provided with a supply passage 34 for introducing compressed air, inlet and outlet passages 36, 38 which are connected with the diaphragm motor 28. Pressure gages 40a–40c are respectively mounted on the supply passage 34 and the inlet and outlet passages 36, 38. A cable connector 42 connected to the printed board 14 is disposed for the casing 12.

Next, the positioner 10 is explained with reference to the circuit block diagram of FIG. 3.

Input signals a which are indicated as voltage values or the like are inputted to an input unit 52 of the printed board 14 of the positioner 10 from an input terminal 50 by way of the cable connector 42. The input unit 52 includes an A/D converter, for example, and converts input signals to digital values and inputs them to a command operation unit (a signal conversion unit) 54. The display unit 16, the key entry unit 18 and a memory unit 56 made up of rewritable RAM and the like are connected to the command operation unit 54.

A control operation unit (a control unit) 60 is connected to the command operation unit 54 and outputs of the control operation unit 60 are inputted to an electricity-air conversion unit (conversion means) 62. The electricity-air conversion unit 62 converts the pressure of the compressed air supplied from a fluid pressure supply source 64 to a pressure corresponding to outputs of the control operation unit 60 and outputs it to the diaphragm motor 28 as an output signal e. The angle sensor 24 which is connected to the rotary shaft 30 of the diaphragm motor 28 detects the rotational angle of the rotary shaft 30 and inputs it to the control operation unit 60 as an angle signal c.

Figure 4:
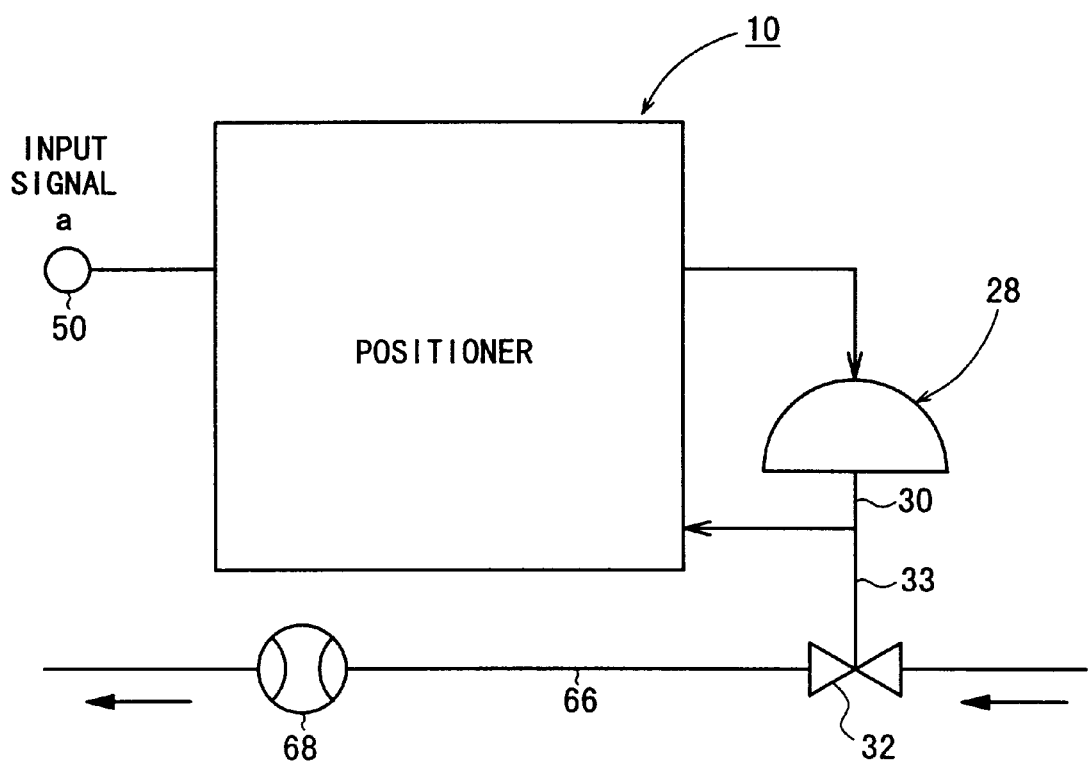
FIG. 4 is a circuit block diagram showing the relation among the positioner shown in FIG. 1, a valve connected with the positioner and a pipeline connected with the valve.

As shown in FIG. 4, a pipeline 66 for fluid is connected to the valve 32 which is connected to the positioner 10 and a flowmeter 68 is mounted on the pipeline 66.

The positioner 10 according to this embodiment basically has the above-mentioned construction. The operation of the positioner 10 will be explained hereinafter in connection with the setting method according to this embodiment.

First of all, in case there is a key entry or key input for regulating the conversion relation from the input signals to the command signals from the key entry unit 18 of the positioner 10 (step S1 in FIG. 5), the operation proceeds to a subroutine for regulating the conversion relation (step S2). In case there is no key entry or key input for regulating the conversion relation at the step S1, the operation proceeds to a subroutine for controlling the valve 32 as originally expected (step S3).

Figure 6:
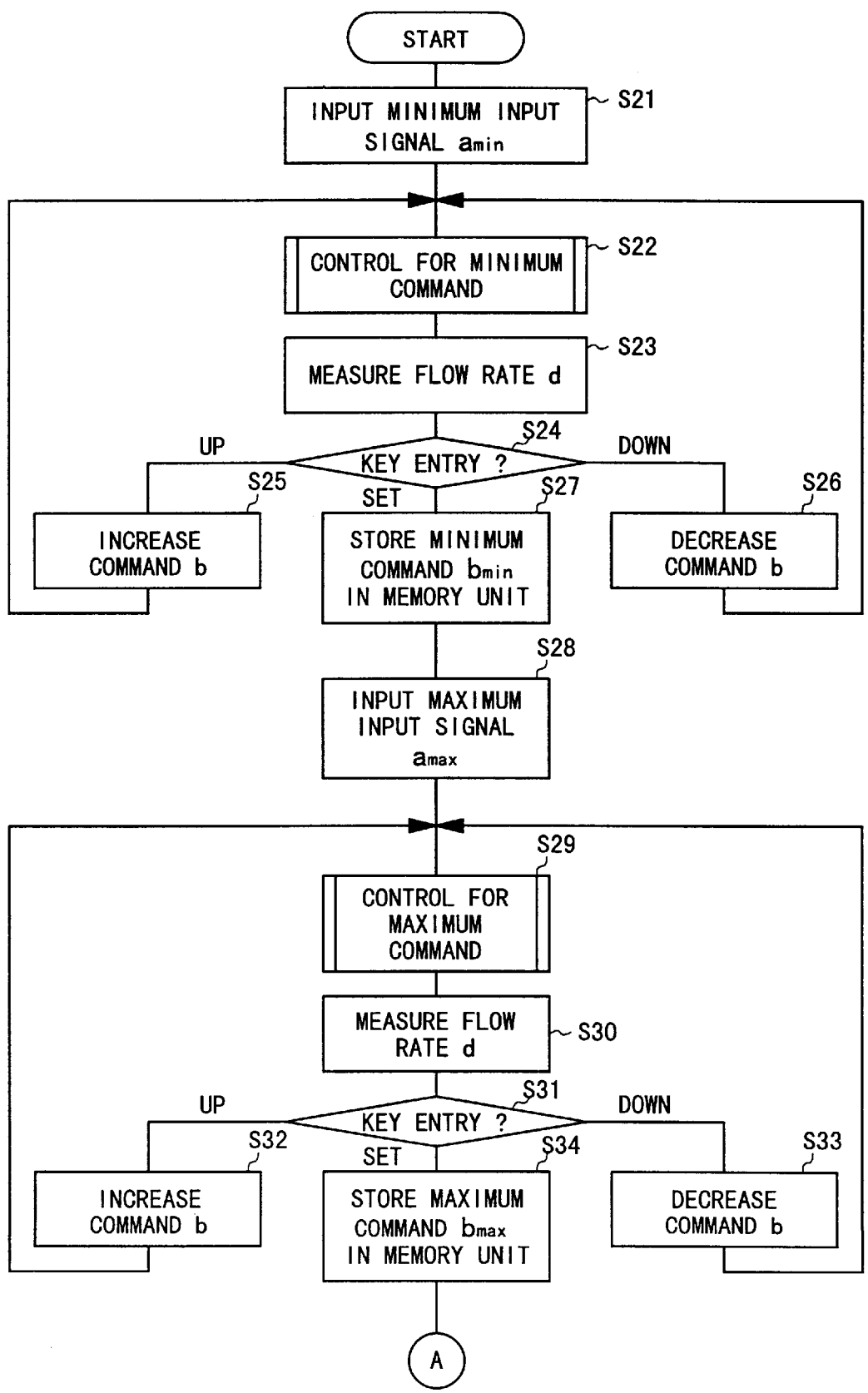
FIG. 6 is a flow chart of the manner of setting the positioner according to the embodiment of the present invention, which shows steps for setting a minimum command and a maximum command.

Here, the subroutine for regulating the conversion relation is explained with reference to FIG. 6.

The conversion relation of commands (command signals) b which are angles of the rotary shaft 30 relative to the input signals a is preliminarily stored in the memory unit 56. In this conversion relation, as shown by a broken line 70 in FIG. 8, the input signals a and the commands b are set to be in a proportional relation. Here, controlled variable, namely, the flow rate d of a fluid which flows through the valve 32 varies corresponding to the commands b so that it follows a curve 72 shown in FIG. 8.

In the above condition, first of all, a minimum input signal $a_{min}$ which is the smallest value among the input signals a is inputted to the input terminal 50 (step S21). The minimum input signal $a_{min}$ is converted to a digital value by the input unit 52 and is inputted to the command operation unit 54. In this command operation unit 54, a command (the minimum command signal) b which corresponds to the minimum input signal $a_{min}$ is read out from the memory unit 56 (see the broken line 70) and the angle of the rotary shaft 30 of the diaphragm motor 28 is controlled to the command b (step S22).

To explain this control in detail, the command b is outputted from the command operation unit 54 to the control operation unit 60. On the other hand, the angle of the rotary shaft 30 of the diaphragm motor 28 is converted to an electric signal by the angle sensor 24 and the electric signal is inputted to the control operation unit 60 as an angle signal c.

In this control operation unit 60, the difference between the command b and the angle signal c is calculated and a control operation such as a PID control or the like is implemented on this difference and its result is inputted to the electricity-air conversion unit 62.

Subsequently, the electricity-air conversion unit 62 controls the pressure of the compressed air supplied from the fluid pressure supply source 64 based on the above computed result. This compressed air is outputted to the diaphragm motor 28 from the input and output passages 36, 38 as an output signal e and the rotary shaft 30 is rotated. The control of pressure can be performed in such a manner that a solenoid valve or the like mounted on the positioner 10 (not shown) is controlled so as to change the supply passage for compressed air to the diaphragm motor 28. In this manner, the output of the diaphragm motor 28, namely, the angle of the rotary shaft 30 gradually approaches the command b and finally agrees with the command b and hence, the degree of opening of the valve 32 is regulated.

Here, the flow rate d is measured by the flowmeter 68 (step S23). Then, the setting of the minimum command $b_{min}$ which can obtain a desired minimum flow rate $d_{min}$ is performed at the key entry unit 18 (step S24). In this case, when the up key 20a is manipulated, the value of the command b is increased (step S25), while when the down key 20b is manipulated, the value of the command b is decreased (step S26). Accordingly, the rotary shaft 30 is rotated corresponding to the change of the value of the command b (step S22). Then, when the flow rate d measured by the flowmeter 68 reaches the desired controlled variable, namely, the minimum flow rate $d_{min}$, by manipulating the set key 20c the changed command b is stored as the minimum command $b_{min}$ in the memory unit 56 (step S27). Here, it is sufficient for an operator to recognize the relation between the minimum input signal $a_{min}$ and the minimum flow rate $d_{min}$ and it is unnecessary for the operator to know the minimum command $b_{min}$.

Subsequently, a maximum input signal $a_{max}$ which is the largest value among the input signals a is inputted to the input terminal 50 (step S28). The maximum input signal $a_{max}$ is converted to a digital value by the input unit 52 and is inputted to the command operation unit 54. In this command operation unit 54, a command (the maximum command signal) b which corresponds to the maximum input signal $a_{max}$ is read out from the memory unit 56 (see the broken line 70) and is outputted to the control operation unit 60. Accordingly, the rotary shaft 30 of the diaphragm motor 28 is controlled to the angle corresponding to this command b and the flow rate d of the fluid which flows through the valve 32 is changed (step S29). Then, the flow rate d is measured by the flowmeter 68 (step S30).

Then, the setting of the maximum command $b_{max}$ which can obtain a desired maximum flow rate $d_{max}$ is performed at the key entry unit 18 (step S31). In this case also, in the same manner as the steps S25 to S27, when the up key 20a is manipulated, the value of the command b is increased (step S32), while when the down key 20b is manipulated, the value of the command b is decreased (step S33). Accordingly, the rotary shaft 30 is rotated corresponding to the change of the value of the command b and the flow rate d flown to the valve 32 is changed (step S29). Then, when the flow rate d reaches the desired controlled variable, namely, the maximum flow rate $d_{max}$ by manipulating the set key 20c the changed command b is stored as the maximum command $b_{max}$ in the memory unit 56 (step S34). Here, it is also sufficient for the operator to recognize the relation between the maximum input signal $a_{max}$ and the maximum flow rate $d_{max}$ and it is unnecessary for the operator to know the maximum command $b_{max}$.

Figure 7:
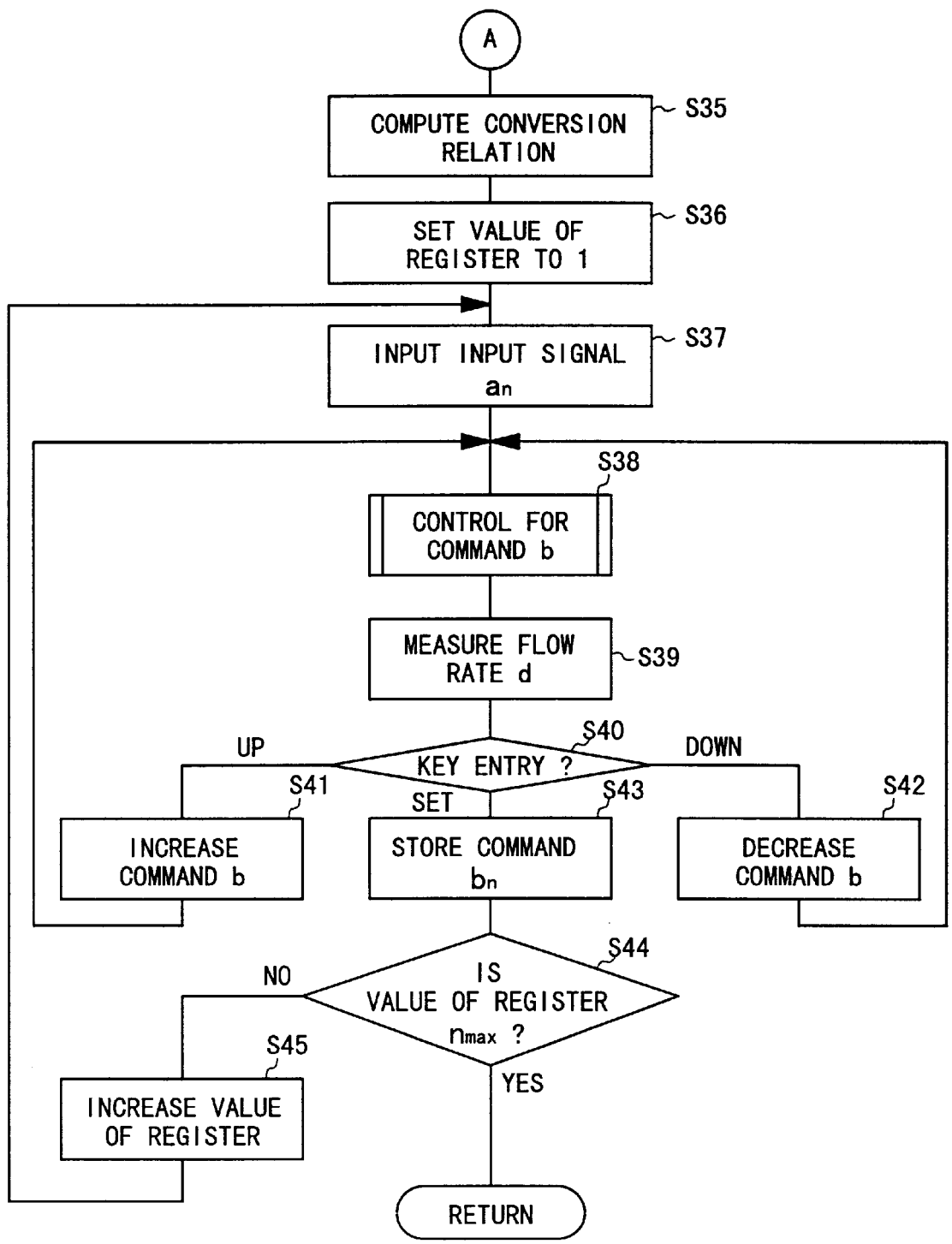
FIG. 7 is a flow chart of the manner of setting the positioner according to the embodiment of the present invention, which shows steps for setting given commands.
Figure 8:
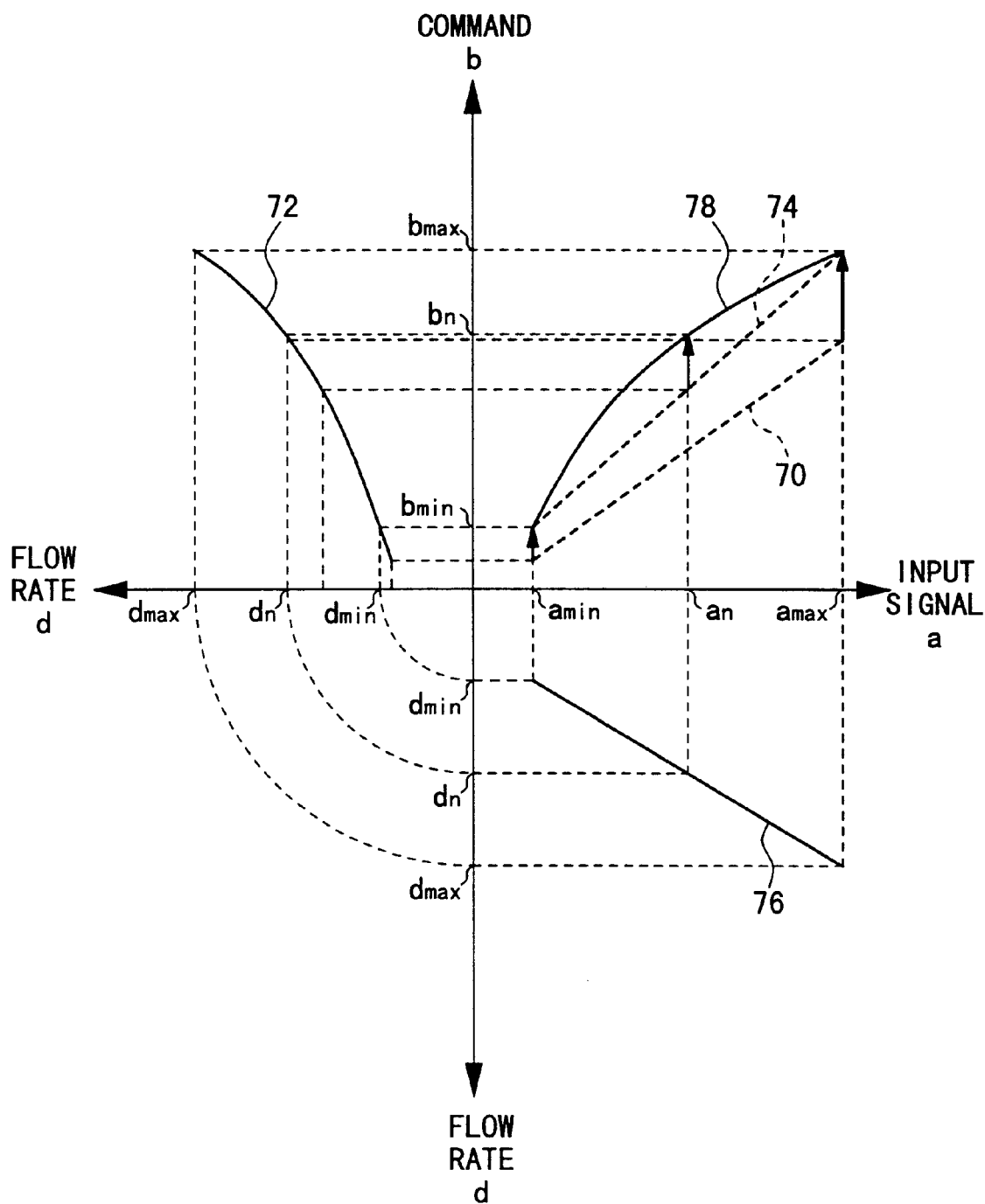
FIG. 8 is a graph showing the relation among the input signals inputted in accordance with the method for setting the positioner according to the embodiment of the present invention, the commands and the flow rate.

After setting the minimum command $b_{min}$ and the maximum command $b_{max}$ in the above manner, the command operation unit 54 computes a conversion relation in which a given command (given command signal) $b_n$ relative to a given input signal $a_n$ is arranged on a straight line which connects a cross point of the minimum input signal $a_{min}$ and the minimum command $b_{min}$ and a cross point of the maximum input signal $a_{max}$ and the maximum command $b_{max}$ as shown by a broken line 74 in FIG. 8, and such a conversion relation is stored in the memory unit 56 (step S35 in FIG. 7). In this case, for example, a plurality of commands $b_1$ to $b_9$ are set 13 corresponding to a plurality of input signals $a_1$ to $a_9$ which are equally divided between the minimum input signal $a_{min}$ and the maximum input signal $a_{max}$. Here, the value n is 1 to 9 and the maximum value $n_{max}$ of the value n is set to 9.

Subsequently, the command $b_n$ is altered such that the flow rate d of the fluid becomes proportional to the input signal a and the conversion relation of the command $b_n$ relative to the input signal a stored in the memory unit 56 is regulated. In this method, first of all, the value of a register in the command operation unit 54 (not shown) is set to 1

(step S36). Subsequently, the input signal $a_n$ which corresponds to the value of the register, namely, the input signal $a_1$ in this case, is inputted to the input terminal 50 (step S37). This input signal $a_1$ is converted to a digital value by the input unit 52 and is inputted to the command operation unit 54. At the command operation unit 54, the command $b_n$ which corresponds to the input signal $a_n$ is read out from the memory unit 56 and is outputted to the control operation unit 60. Accordingly, the rotary shaft 30 of the diaphragm motor 28 is controlled to the angle which corresponds to this command $b_n$ (step S38). Then, the flow rate d of the fluid which flows through the valve 32 is 10. measured (step S39).

Then, the setting of the command is performed at the key entry unit 18 (step S40). In this case also, in the same manner as the steps S25 to S27, when the up key 20a is manipulated, the value of the command is increased (step S41), while when the down key 20b is manipulated, the value of the command is decreased (step S42). Accordingly, the rotary shaft 30 is rotated corresponding to the change of the value of the command and the flow rate d of the fluid which flows through the valve 32 is changed (step S38). Then, the command b is changed such that the flow rate d takes the value proportional to the input signal a as shown in a straight line 76 in FIG. 8 and the set key 20c is manipulated so as to store this value of the command $b_n$ into the memory unit 56 (step S43).

Subsequently, it is determined whether the value n set to the register is the value $n_{max}$ or not (step S44). Since the value n is not the value $n_{max}$ in this case, the value of, the register is increased by 1 so that the value n is set to 2 (step S45). Subsequently, the operation returns to the step S37 and the input signal $a_n$ which corresponds to the value n of the register, namely, the input signal a2 in this case, is inputted to the input terminal 50. Thereafter, the steps ranging from the step S38 to the step S45 are repeated and the value of the altered command $b_n$ namely the value of the command $b_2$ in this case, is stored in the memory unit 56.

In the same manner, the value n of the register is increased in sequence and the values of the commands $b_n$ corresponding to respective values n of the register are stored in the memory unit 56.

Figure 5:
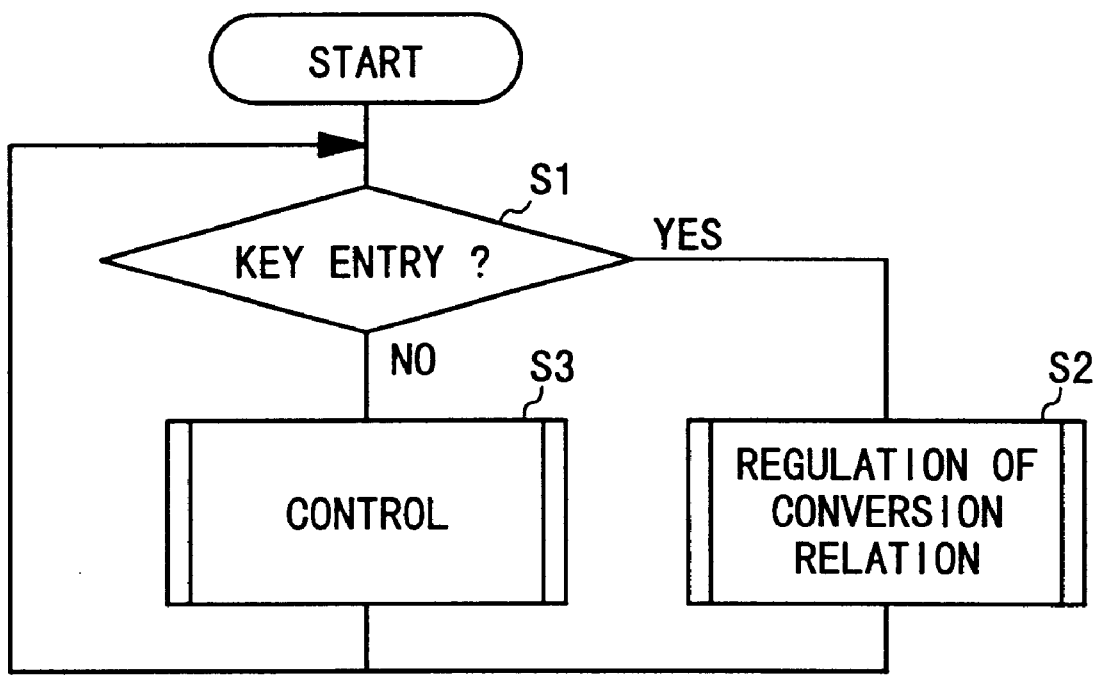
FIG. 5 is a flow chart showing the manner of using the positioner according to the embodiment of the present invention.

The command $b_n$ is determined in the above manner and when the value n of the register becomes $n_{max}$ in the step S44, the operation returns to the step S1 in FIG. 5. As mentioned previously, in case there is no key entry or key input for regulating the conversion relation, the operation proceeds to the control subroutine so as to control the diaphragm motor 28 (step S3).

The conversion relation of the command b relative to the input signal a which is determined in the above-mentioned manner takes a curve as shown by the curve 78 in FIG. 8, while in this case, the input signal a and the flow rate d are in a proportional relation as shown by the straight line 76. Furthermore, it is sufficient for the operator to recognize the input signal a and the desired flow rate d, while it is unnecessary for the operator to know the command b, namely, the relation between the angle of the rotary shaft 30 and the flow rate d (the curve 72). Still furthermore, the relation of the flow rate d of the fluid relative to the input signal a set in the above manner is not limited to the proportional relation and includes a non-linear relation if necessary.

As explained above, according to the embodiment, it is unnecessary to preliminarily measure the flow rate d of the fluid relative to the angle of the rotary shaft 30 of the diaphragm motor 28 so that the characteristics of the flow rate d relative to the input signal a can be readily set.

What is claimed is:

1. A positioner for generating an output signal for setting a controlled object to a control condition corresponding to an input signal, comprising:

a memory unit for storing a conversion relation for converting said input signal to a command signal;

a signal conversion unit for converting said input signal to said command signal based on said conversion relation;

a control unit for generating said output signal for controlling said controlled object corresponding to said command signal; and a setting unit for adjusting said command signal to obtain a desired control condition for each of a plurality of selected input signals, thereby generating a modified conversion relation between said input signal and said command signal, wherein said modified conversion relation generated by said setting unit is stored in said memory unit as said conversion relation.

2. A positioner according to claim 1, wherein said control unit comprises means for comparing said command signal with a control condition signal based on said output signal of said controlled object and for performing control in such a manner that said control condition signal matches said command signal.

3. A positioner according to claim 1, wherein said controlled object is a diaphragm motor.

4. A positioner according to claim 3, wherein conversion means which converts said output signal to a fluid pressure signal to drive said diaphragm motor is interposed between said control unit and said diaphragm motor.

5. A method for setting a conversion relation in a positioner for generating an output signal for setting a controlled object to a control condition corresponding to an input signal, comprising the steps of:

storing a preliminary conversion relation between said input signal and a command signal;

converting said input signal to said command signal using said preliminary conversion relation, so that said output signal is generated based on said command signal;

controlling said controlled object based on said output signal so as to obtain a controlled variable thereof;

modifying said preliminary conversion relation by adjusting said command signal to obtain desired values of said control variable for each of a plurality of selected input signals; and setting said modified conversion relation as said conversion relation in said positioner.

6. A method according to claim 5, wherein in a minimum command signal corresponding to a minimum input signal, a maximum command signal corresponding to a maximum input signal, and a given command signal corresponding to a given input signal set between said minimum input signal and said maximum input signal are respectively regulated in such a manner that said desired control variable is obtained whereby said conversion relation is regulated.

7. A method according to claim 6, wherein more than one said given input signal is set between said minimum input signal and said maximum input signal.

8. A method according to claim 5, wherein said conversion relation is set such that said control condition of said controlled object has a linear relation with respect to said input signal.

* * * * *